(12) United States Patent
Khan et al.

(10) Patent No.: US 8,970,661 B2
(45) Date of Patent: Mar. 3, 2015

(54) ROUTING FOR VIDEO IN CONFERENCING

(71) Applicant: Microsoft Corporation, Redmond, WA (US)

(72) Inventors: Humayun M. Khan, Issaquah, WA (US); Timothy M. Moore, Bellevue, WA (US); Rajesh Gunnalan, Sammamish, WA (US); Kensaku Sueda, Kirkland, WA (US); Jiannan Zheng, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 186 days.

(21) Appl. No.: 13/656,675

(22) Filed: Oct. 20, 2012

(65) Prior Publication Data

US 2014/0111603 A1    Apr. 24, 2014

(51) Int. Cl.
*H04N 7/15*    (2006.01)
(52) U.S. Cl.
CPC ..................................... *H04N 7/15* (2013.01)
USPC .................. 348/14.11; 348/14.08; 348/14.09; 348/14.12
(58) Field of Classification Search
CPC ......... H04N 7/14; H04N 7/141; H04N 7/142; H04N 7/147; H04N 7/148; H04N 7/15; H04N 7/152
USPC ........................................... 348/14.01–14.16
See application file for complete search history.

(56) References Cited

U.S. PATENT DOCUMENTS

| 6,457,043 | B1 | 9/2002 | Kwak et al. |
| 7,185,054 | B1 | 2/2007 | Ludwig et al. |
| 7,453,828 | B1 | 11/2008 | Surazski et al. |
| 7,664,246 | B2 | 2/2010 | Krantz et al. |
| 2004/0125932 | A1 | 7/2004 | Orbach et al. |
| 2004/0249967 | A1* | 12/2004 | Swanson ................ 709/231 |
| 2006/0200518 | A1* | 9/2006 | Sinclair et al. ............... 709/204 |
| 2009/0015657 | A1 | 1/2009 | Wong |

(Continued)

OTHER PUBLICATIONS

Volfin, Ilana et al., "Dominant Speaker Identification for Multipoint Videoconferencing," In Special Issue of Computer Speech and Language on Multisource Environments, (downloaded from: http://webee.technion.ac.il/Sites/People/IsraelCohen/Publications/CSL_2012_Volfin.pdf), Mar. 16, 2012, (23 pages).

(Continued)

*Primary Examiner* — Melur Ramakrishnaiah
(74) *Attorney, Agent, or Firm* — Andrew Smith; Jim Ross; Micky Minhas

(57) ABSTRACT

Methods and systems for routing video in conferencing are disclosed. A device receives one or more data streams from a media source, where each data stream associated with a data stream identifier. A media source identifier is assigned to each data stream from the media source. The data stream identifiers are mapped to the media source identifiers. At least one of the data streams may be modified by replacing an associated data stream identifier with the media source identifier. The modified data streams are provided to a destination device. A request is received from a destination device for data streams associated with a media source identifier. One or more data stream identifiers are associated with the requested media source identifier. The one or more data streams may be associated with Application sharing/Desktop Sharing, a video quality, a video resolution, a video frame rate, or an audio quality.

19 Claims, 8 Drawing Sheets

(56) References Cited

U.S. PATENT DOCUMENTS

| | | | |
|---|---|---|---|
| 2010/0315484 A1* | 12/2010 | Ramanathan et al. | 348/14.09 |
| 2011/0217021 A1 | 9/2011 | Dubin et al. | |
| 2011/0292161 A1* | 12/2011 | Sharon et al. | 348/14.07 |
| 2011/0310216 A1 | 12/2011 | Lee et al. | |
| 2012/0013705 A1* | 1/2012 | Taylor et al. | 348/14.08 |
| 2012/0069133 A1 | 3/2012 | Wu | |
| 2013/0063542 A1* | 3/2013 | Bhat et al. | 348/14.03 |

OTHER PUBLICATIONS

Microsoft, "Dominant Speaker Notification," (downloaded from: http://msdn.microsoft.com/en-us/library/dd946761%28v=office.12%29.aspx on Oct. 5, 2012), 2012, (1 page).

University of Delaware, "Multipoint Video Conferencing (Bridge)," (downloaded from: http://ats.udel.edu/conferencing/multipoint.php on Sep. 28, 2012), Jul. 13, 2012, (2 pages).

* cited by examiner

ROUTING FOR VIDEO IN CONFERENCING

BACKGROUND

Video conferencing is a technology that has been instrumental in the advancement and development of global commerce. Video conferencing can facilitate meetings and collaborations between parties in different geographic locations, including different cities, states or provinces, and even different continents. Video conferencing can be conducted using dedicated video conferencing applications, or integrated into applications or websites for collaboration, social networking, public forums, and the like. In addition, dedicated and secured video conferencing systems can be used in business environments.

A video conferencing system typically includes one or more video capture devices in communication with a video conferencing server over a network. Some video conferencing systems even allow users to view multiple video streams at the same time. Video conferencing systems also typically include an audio capture device in communication with the video conferencing server.

The video and audio streams are generally communicated to the video conferencing server as digital data streams, such as Internet Protocol (IP) data streams. In other systems, the video is communicated independently of the audio. For example, some systems only communicate the video to the video conferencing server, while the audio is communicated via a telephone bridge.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Regardless of the actual system configuration, it is often valuable to be able to link the audio and video signals coming from the same user in a video conferencing system. Multiview systems allow video streams from several video conferencing participants to be displayed simultaneously to users. In such systems, it is helpful to identify the last few Dominant Speakers (DS) so that the video associated with the DS may be displayed to users. A variety of criteria may be used to identify the DS, for example the speaker with the highest volume audio signal may be selected as a DS. Alternatively, a speaker with a most active audio signal may be selected as a DS.

Once the DS is identified by the video conferencing server, the video conferencing server may then push the video stream associated with the DS to the participants, and each participant's video conferencing application may indicate the DS in some way. For example, the video of the DS may be rendered in a larger window. Alternatively, the video of the DS may be highlighted or tagged in some manner.

Embodiments of methods and systems for active speaker identification in video conferencing are described. Such methods and systems identify a list of DSs. In one embodiment, the list includes identification of a group of most recent DSs. In another embodiment, the DS list includes identification of a group of most active DSs. In one embodiment, the DS list may include a Media Source Identifier (MSID) associated with each of the DSs on the list. The DS list may be distributed to each client in the video conference.

In one embodiment, each of the clients may request a set of video streams for rendering by the client. In one embodiment, the client may request the set of video streams associated with the DSs identified on the DS list. Alternatively, each participant may request a set of video streams associated with a user selection. In still another embodiment, a combination of the DSs on the DS list and the user selection may be requested by the client.

A computer-implemented method performing one embodiment receives one or more data stream identifiers. Each data stream identifier is associated with a data stream available from a media source. A media source identifier (MSID) is assigned to the media source. The data stream identifiers available from the media source are mapped to the media source identifier assigned to the media source.

A source may generate multiple video streams. Each stream may be at a different resolution and/or produced by a different codec. The video streams may be labeled with a video stream identifier. One or more stream identifiers may be associated with a requested media source identifier. One or more stream identifiers may be associated with the requested media source identifier and a requested video quality. Video streams associated with the one or more stream identifiers may be provided to a remote device in response to a media request.

In other embodiments, a list of dominant speakers may be generated. The list of dominant speakers may be provided to a client. The list of dominant speakers may comprise a media source identifier for each of the dominant speakers. One or more data streams associated with each of the media source identifiers on the dominant speaker list may be automatically provided to a client device.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments disclosed herein are directed to methods, systems, and software for active speaker identification in video conferencing. These systems and methods may be incorporated into a wide range of systems and solutions for video conferencing, including for example, dedicated video conferencing systems, web-based video conferencing systems, and application-driven video conferencing systems. Certain embodiments may be incorporated into applications with additional content, such as collaboration software, and may provide a significant commercial benefit over previous versions of such software because of an enhanced overall user experience.

Figure 1:
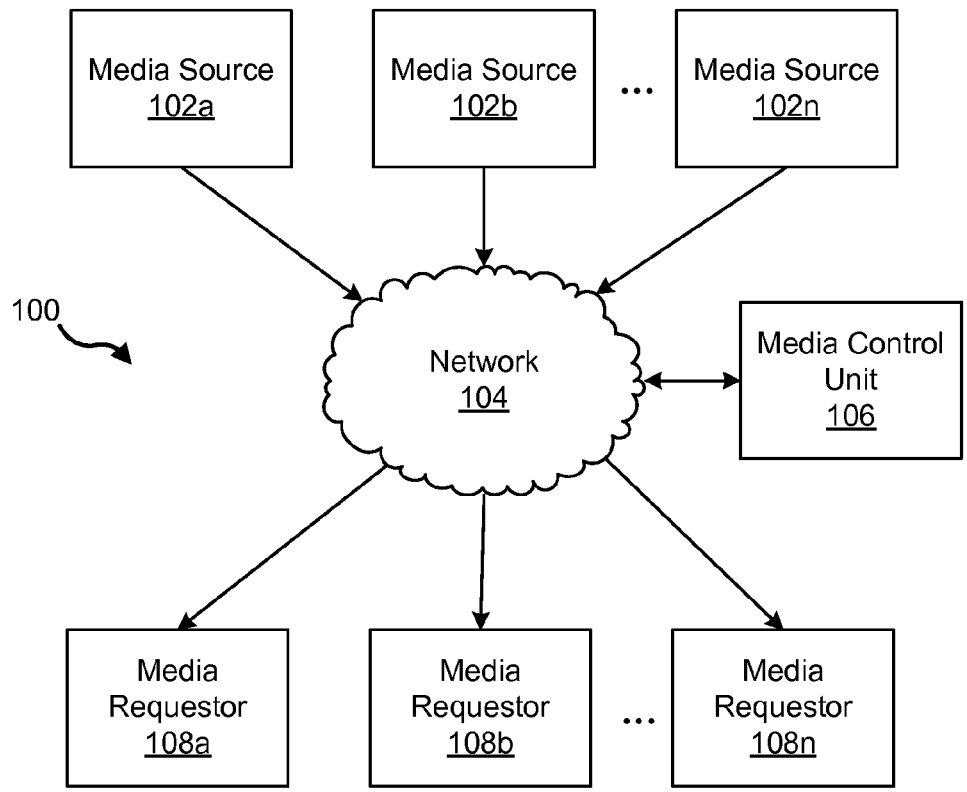
FIG. 1 is a schematic block diagram illustrating one embodiment of a system for active speaker identification in video conferencing.

FIG. 1 is a schematic block diagram illustrating one embodiment of a system 100 for active speaker identification in video conferencing. The system 100 may include one or more media sources 102a-n coupled to a Multipoint Control Unit (MCU) 106. In one embodiment, the media sources 102a-n are coupled to the MCU 106 through a network 104. In addition, one or more media requestors 108a-n may be coupled to the network 104. One of ordinary skill in the art may recognize various topologies of system 100 that may be more or less suitable for use with the present embodiments.

In one embodiment, the media sources 102a-n may include video capture devices. The video capture devices may include, for example, a video camera, webcam, or other specialized video conferencing capture device. In certain embodiments, the video capture device may be coupled to a computer or other hardware suitable for running a video codec which may generate one or more data streams from the video captured by the video capture device. The media sources 102a-n may then each transmit the data streams through the network 104. In one embodiment, the media sources 102a-n may transmit the data streams to the MCU 106. Alternatively, the media sources 102a-n may transmit the data streams to the media requestors 108a-n at a destination device upon receiving instructions from the MCU or a direct request from one of the media requestors 108a-n.

In one embodiment, the network 104 may include one or more network routing devices. For example, the network 104 may include one or more Internet routing devices configured to route traffic from the media sources 102a-n to, for example, the MCU 106.

The MCU 106 may be configured to route audio and/or video from the media sources 102a-n to the media requestors 108a-n. Because the MCU 106 handles routing of audio and video data streams, the MCU 106 is sometimes referred to as an Audio Video MCU (AVMCU). In one embodiment, the MCU 106 may be configured as a bridge to connect calls from multiple sources. Participants in a video conference may call the MCU 106, or alternatively the MCU 106 may call the participants once video conference configuration information has been set. The MCU 106 may use various communication protocols, such as IP, Voice Over IP (VOIP), or Plain Old Telephone Service (POTS) networks for communication of video and/or audio data streams. In one embodiment, the MCU 106 may be configured as a web-based server of a web-based video conferencing application. In another embodiment, the MCU 106 may operate in the background, participating only in the routing of data streams between the media sources 102a-n and media requestors 108a-n. The MCU may be configured in software, hardware, or a combination of the two.

A media requestor 108a-n may be a computing device configured to receive media data streams originating from the media sources 102a-n and render the data streams into displayed video. In one embodiment, a media requestor 108a-n may be a desktop computer. In another embodiment, the media requestor 108a-n may be a laptop, tablet, or mobile Personal Computer (PC). In still a further embodiment, the media requestor 108a-n may be a smartphone, Personal Data Assistant (PDA), mobile phone, or the like. One of ordinary skill in the art will recognize various embodiments of a media requestor 108a-n that may be adapted for use with the present embodiments.

Figure 2:
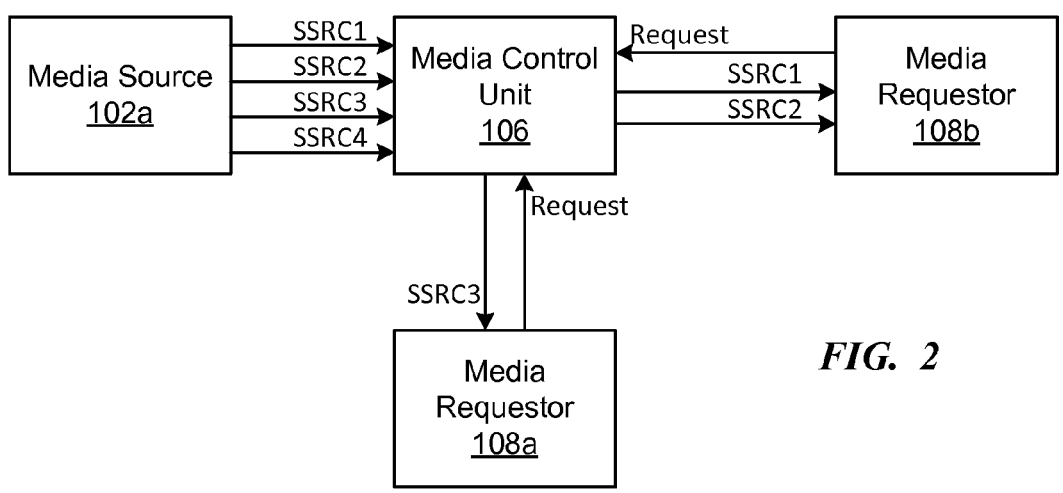
FIG. 2 is a schematic block diagram illustrating one embodiment of signal communications in a system for active speaker identification in video conferencing.

FIG. 2 is a schematic block diagram illustrating one embodiment of signal communications in a system 100 for active speaker identification in video conferencing. In the depicted embodiment, a first media source 102a is configured to send a plurality of data streams to the MCU 106.

The first media source 102a may include a codec configured to generate multiple layers of video including, but not limited to various Common Intermediate Format (CIF) layers, or high Definition (HD) layers. For example, a common codec may be configured to generate fifty (50) or more video layers, including but not limited to, SQCIF, QCIF, 4CIF, 16CIF, DCIF, HD 720p, HD 1080i, HD 1080p, and the like. One of ordinary skill in the art will recognize a variety of video layers that may be included in separate data streams. The video layers may include video of different frame rates, different resolution, and/or different color schemes. In addition, the data streams may include audio.

In the depicted embodiment, the first media source 102a sends four different media data streams to the MCU 106. Each media data stream includes a data stream identifier. For example, in the depicted embodiment the data stream identifier is a Synchronization Source (SSRC) identifier. Each data stream may include data associated with a different layer of media streaming from the first media source 102a.

In one embodiment, the MCU 106 may also receive requests for data streams from a first media requestor 108a and a second media requestor 108b. Due to hardware, or codec limitations, the first media requestor 108a and the second media requestor 108b may not be able to render the same quality of video. Thus, the first media requestor 108a and the second media requestor 108b may request different data streams from the MCU 106. In response to the request, the MCU 106 may send the data streams associated with SSRC1 and SSRC2 to the second media requestor 108b and the data stream associated with SSRC3 to the first media requestor. If neither the first media requestor 108a, nor the second media requestor 108b requests the fourth data stream, the MCU 106 may not pass the data stream associated with SSRC4 to either media requestor 108a-b. As described below, communications between the media requestors 108a-n and the MCU 106 may include information, such as MSIDs that may simplify routing of the data streams.

Figure 3:
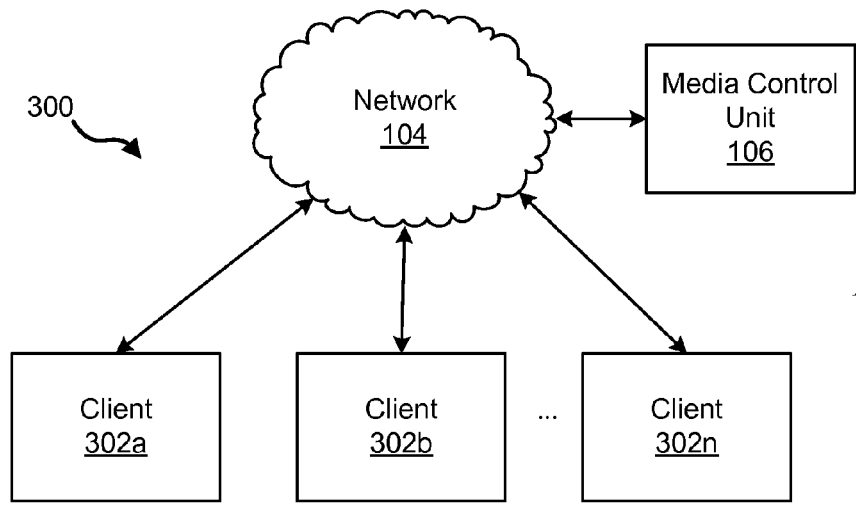
FIG. 3 is a schematic block diagram illustrating another embodiment of a system for active speaker identification in video conferencing.

FIG. 3 is a schematic block diagram illustrating another embodiment of a system 300 for active speaker identification in video conferencing. In this embodiment, the system 300 may include a network 104 and an MUC 106 substantially as described with relation to FIG. 1 above. However, in this embodiment, the system may include a plurality of clients 302*a-n* that are configured to operate as both a media source 102*a-n* and a media requestor 108*a-n*. Thus, each client may generate data streams for communication to the MCU 106 and also request data streams originating from other clients 302*a-n* in the system 300.

Figure 4:
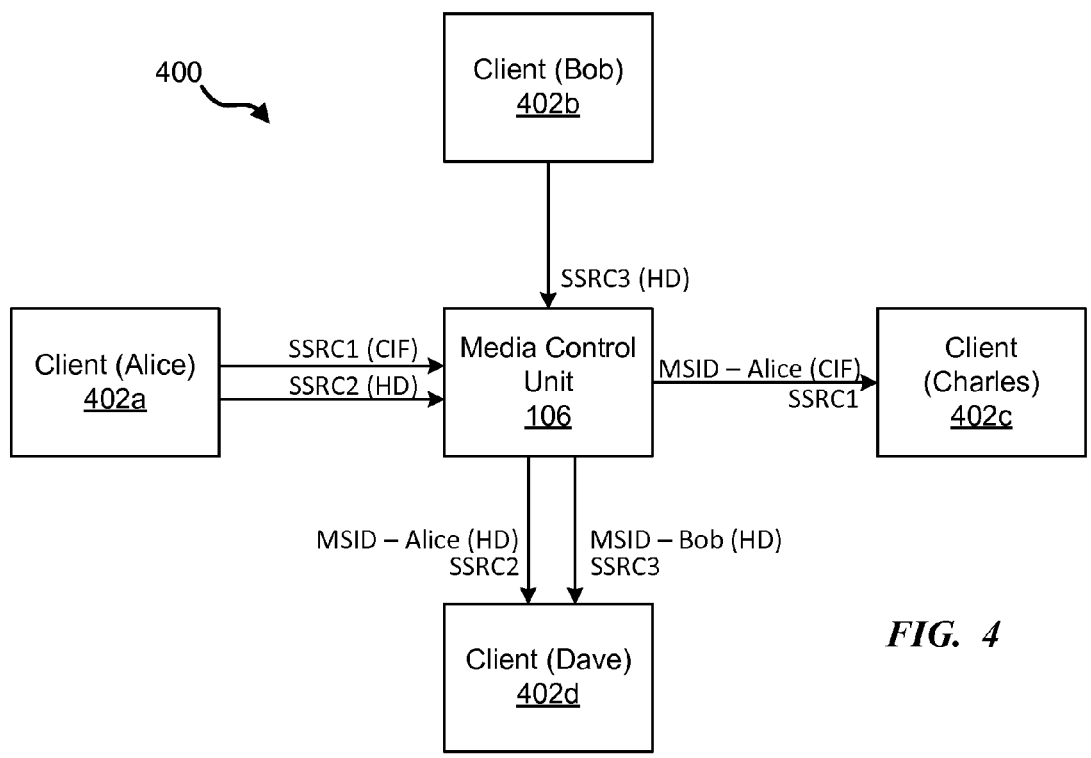
FIG. 4 is a schematic block diagram illustrating another embodiment of signal communications in a system for active speaker identification in video conferencing.

FIG. 4 is a schematic block diagram illustrating another embodiment of signal communications in a system 400 for active speaker identification in video conferencing. In the depicted embodiment, the system 400 includes four clients 402*a-d*. Each of the clients 402*a-d* may be associated with a participant, for example, Alice, Bob, Charles, and Dave. As discussed above, each client 402*a-d* may both generate audio/video data streams, and also request audio/video data streams from other clients 402*a-d*.

By way of example, Alice may be operating client 402*a*, generates video data streams of her in both CIF (SSRC1) and HD (SSRC2) video formats. Similarly, Bob may be associated with client 402*b*, which generates data streams for HD (SSRC3) video format. In such an embodiment, an MSID may be assigned to each client 402*a-d*. For example, the user name (Alice, Bob, Charles, and Dave) may be assigned as the MSID for each respective client 402*a-d*. Thus, MCU 106 may map data stream identifiers (SSRC1, SSRC2, and SSRC3) to the respective MSIDs.

In such an example, Charles may request video from Alice. If Charles' client 402*c* is only capable of rendering the CIF video layer, then Charles may only receive data steam SSRC1. Thus, Charles may make a request to the MCU 106 for CIF layer video from MSID 'Alice.' In such an embodiment, MCU 106 may look up the SSRC associated with CIF video originating from Alice (SSRC1), and provide that data stream to Charles' client 402*c*.

Similarly, Dave's client 402*d* may request HD video from both Bob and Alice. In such an embodiment, Dave's client 402*d* may request MSID 'Alice' and MSID 'Bob' and specify the HD layer. In response, the MCU 106 may look up the SSRC associated with the HD video stream from both Alice and Bob and send both data streams (SSRC2 and SSRC3) to Dave's client 402*d*. Beneficially, in such an example each client only uses an MSID and its own capabilities to generate the request to the MCU. Thus, each client need not store and keep updated a list of each SSRC in use on the system 400.

Figure 5:
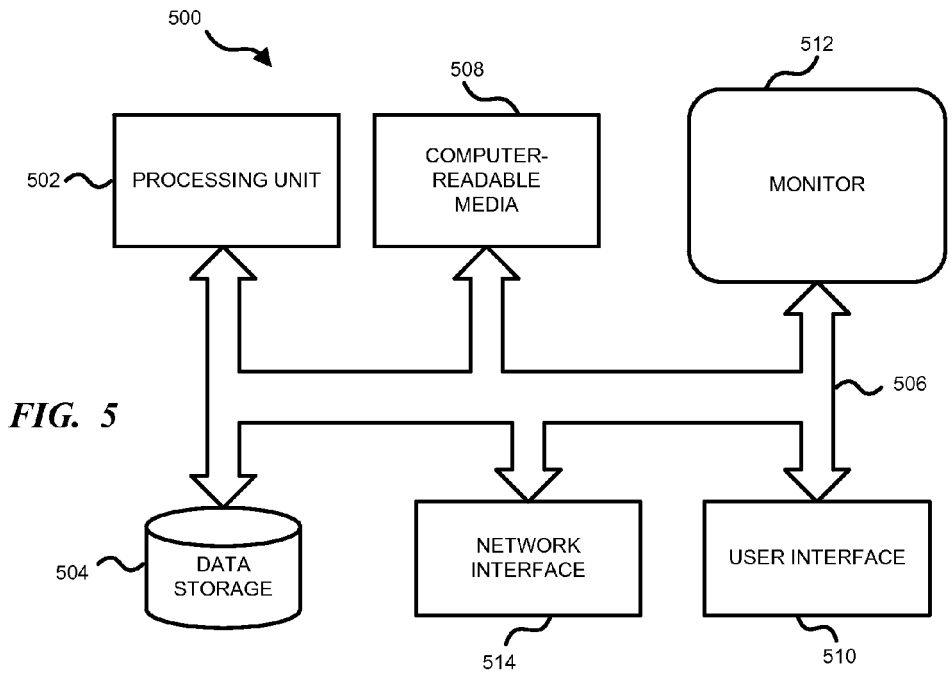
FIG. 5 is a schematic block diagram illustrating one embodiment of a computer system suitable for use in a system for active speaker identification in video conferencing.

FIG. 5 is a schematic block diagram illustrating one embodiment of a computer system 500 suitable for use in a system 100, 300 for active speaker identification in video conferencing. For example, the computer system 500 may be suitable for configuration as an MCU 106, a media source 102*a-n*, a media requestor 108*a-n*, and/or a client 302*a-n*. Components may include, but are not limited to, various hardware components, such as processing unit 502, data storage 504, such as a system memory, and system bus 506 that couples various system components including the data storage 504 to the processing unit 502. The system bus 506 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 500 typically includes a variety of computer-readable media 508. Computer-readable media 508 may be any available media that can be accessed by the computer 500 and includes both volatile and nonvolatile media, and removable and non-removable media, but excludes propagated signals. By way of example, and not limitation, computer-readable media 508 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 500. Communication media may include computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 504 includes computer storage media in the form of volatile and/or nonvolatile memory such as read only memory (ROM) and random access memory (RAM). A basic input/output system (BIOS), containing the basic routines that help to transfer information between elements within computer 500, such as during start-up, is typically stored in ROM. RAM typically contains data and/or program modules that are immediately accessible to and/or presently being operated on by processing unit 502. By way of example, and not limitation, data storage 504 holds an operating system, application programs, and other program modules and program data.

Data storage 504 may also include other removable/non-removable, volatile/nonvolatile computer storage media. By way of example only, data storage 504 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 5, provide storage of computer-readable instructions, data structures, program modules and other data for the computer 500.

A user may enter commands and information through a user interface 510 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 502 through a user input interface 510 that is coupled to the system bus 506, but may be connected by other interface and bus structures, such as a parallel port, game port or a universal serial bus (USB). A monitor 512 or other type of display device is also connected to the system bus 506 via an interface, such as a video interface. The monitor 512 may also be integrated with a touch-screen panel or the like. Note that the monitor and/or touch screen panel can be physically coupled to a housing in which the computing device 500 is incorporated, such as in a tablet-type personal computer. In addition, computers such as the computing device 500 may also include other peripheral output devices such as speakers and printer, which may be connected through an output peripheral interface or the like.

The computer 500 may operate in a networked or cloud-computing environment using logical connections 514 to one or more media devices, such as a media computer. The media computer may be a personal computer, a server, a router, a network PC, a peer device or other common network node, and typically includes many or all of the elements described above relative to the computer 500. The logical connections depicted in FIG. 5 include one or more local area networks (LAN) and one or more wide area networks (WAN), but may also include other networks. Such networking environments are commonplace in offices, enterprise-wide computer networks, intranets and the Internet. In particular, the network interface 514 may include an interface to network 104 for communication of media signals between the computer and, for example, clients 302*a-n* of the network and/or the MCU 106.

When used in a networked or cloud-computing environment, the computer 500 may be connected to a public or private network through a network interface or adapter 514. In some embodiments, a modem or other means for establishing communications over the network. The modem, which may be internal or external, may be connected to the system bus 506 via the network interface 514 or other appropriate mechanism. A wireless networking component such as comprising an interface and antenna may be coupled through a suitable device such as an access point or peer computer to a network. In a networked environment, program modules depicted relative to the computer 500, or portions thereof, may be stored in the media memory storage device. It may be appreciated that the network connections shown are exemplary and other means of establishing a communications link between the computers may be used.

The described embodiments may be implemented in the context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by media processing devices that are linked through a communications network. In a distributed computing environment, program modules may be located in local and/or media computer storage media including memory storage devices.

Figure 6:
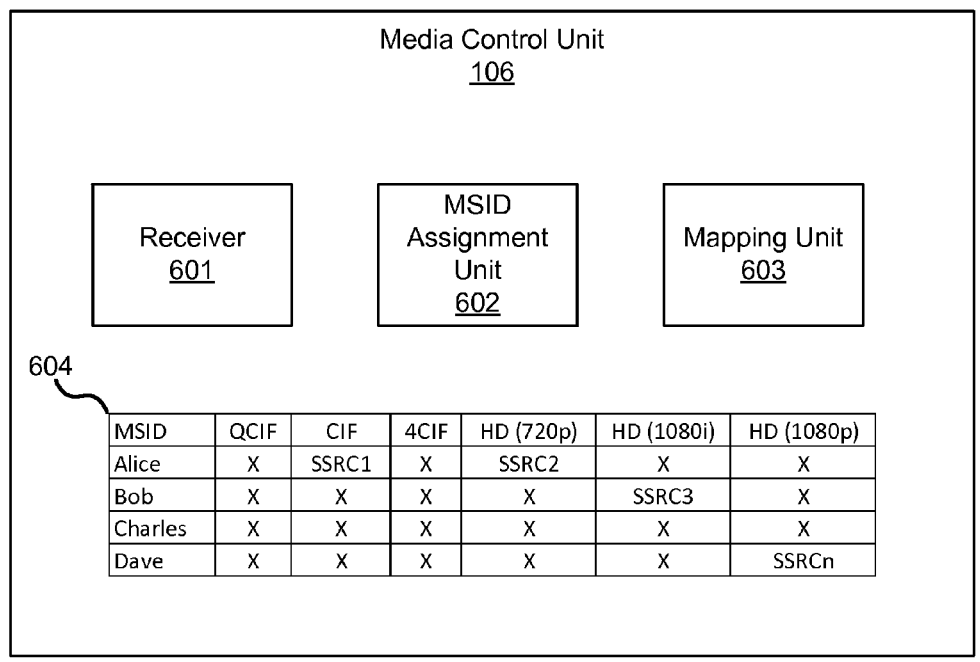
FIG. 6 is a schematic block diagram illustrating one embodiment of an apparatus for active speaker identification in video conferencing.

FIG. 6 is a schematic block diagram illustrating one embodiment of an MCU 106. The MCU 106 may be implemented on hardware such as that described in FIG. 5, but may be specially programmed using computer readable instructions stored on, for example, computer-readable storage media 508.

In one embodiment, MCU 106 may be configured to include multiple modules or units. For example, MCU 106 may include a receiver unit 601, a MSID assignment unit 602, and a mapping unit 603. Further, MCU 106 may generate and store a map 604 for mapping MSIDs to SSRCs.

In one embodiment, the receiver 601 may utilize the network interface 514, to receive data streams from clients 302*a-n*. Additionally, the receiver 601 may receive requests for data streams from the clients 302*a-n*. The receiver may be in communication with the MSID assignment unit 602. The MSID assignment unit 602 may be configured to assign an MSID to each client 302*a-n*. In one embodiment, the MSID assignment unit 602 may assign an MSID that is unique among the group of clients 302*a-n* such that request collisions are avoided. The MSID assignment unit 602 may assign one of a predetermined set of MSIDs. Alternatively, the MSID assignment unit 602 may assign a randomly generated MSID. In another embodiment, the MSID assignment unit 602 may assign an MSID in response to a user input, such as a name, telephone number, email address, user ID, or the like.

The mapping unit 603 may then generate map 604 to associate each data stream received from the clients 302*a-n* with a respective MSID associated with the client 302*a-n*. For example, if MSID assignment unit 602 assigns the MSID 'Alice' to client 302*a*, them mapping unit 603 may tag, group, or otherwise arrange the SSRCs associated with the data streams received from client 302*a* in association with the MSID 'Alice.' Mapping unit 603 may further update the map 604 with additional SSRCs as additional data streams become available from existing clients 302*a-n*, or as new clients 302*a-n* join the video conference.

In one embodiment, the map 604 may be stored in memory on the MCU 106. Alternatively, the map 604 may be stored on a data storage disk, such as a hard disk drive. The map 604 may be stored in database format. Alternatively, the map 604 may be stored as a hash table, an array of strings, an array of arrays, an array of pointers to MSIDs and/or SSRCs, or the like. One of ordinary skill in the art will recognize a variety of arrangements that may be suitable for mapping the MSIDs to SSRCs.

Figure 7:
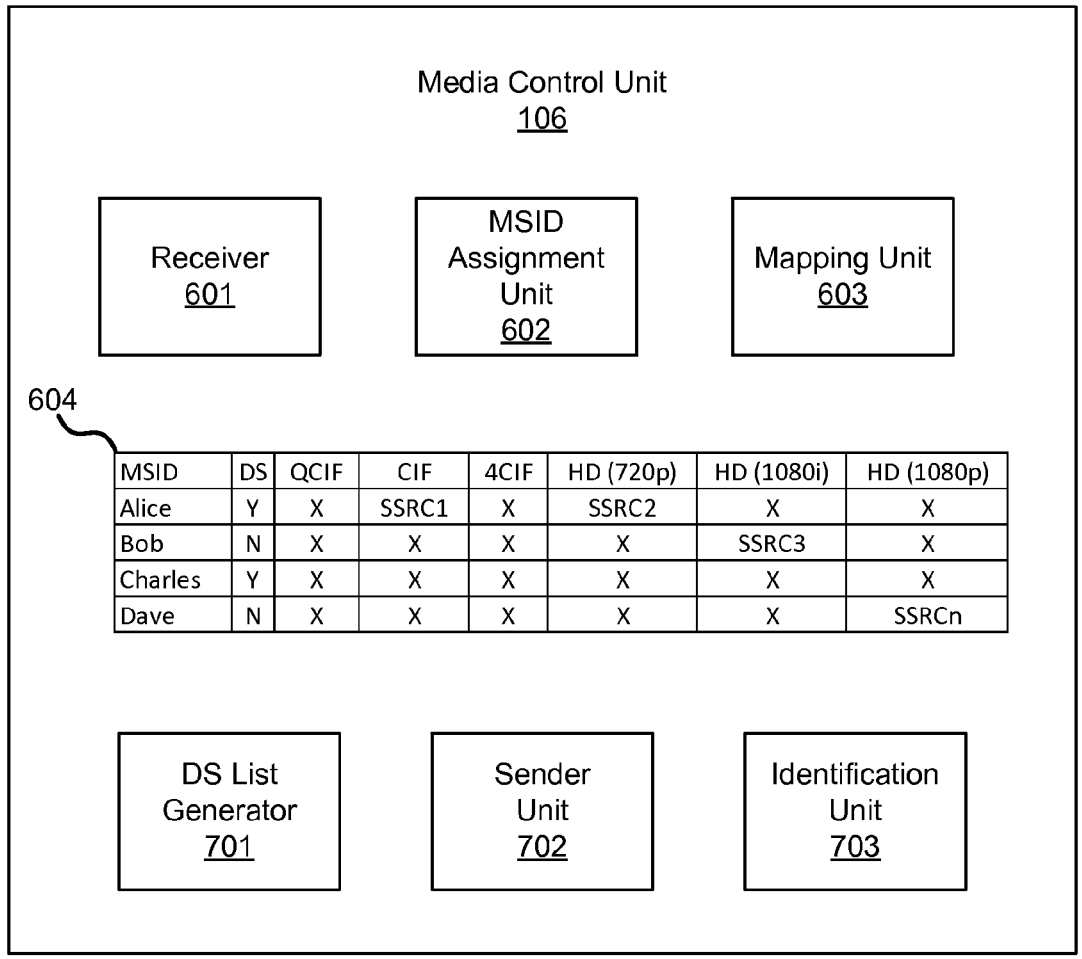
FIG. 7 is a schematic block diagram illustrating a further embodiment of an apparatus for active speaker identification in video conferencing.

FIG. 7 is a schematic block diagram illustrating a further embodiment of an MCU 106. In one embodiment, the MCU 106 includes modules substantially as described in FIG. 6. In addition, FIG. 7 may include a DS list generator 701 a sender 702, and identification unit 703. Additionally, the MCU 106 may include an alternative version of the map 604 which includes identification of DSs.

In one embodiment, the DS list generator 701 may identify a DS through one or more of multiple methods. For example, the DS list generator 701 may identify a DS by measuring the volume of audio signals received from each client 302*a-n* and identifying an audio signal with the highest volume. Alternatively, the DS list generator 701 may identify an audio signal with a greatest amount of activity within a period of time. In still a further embodiment, the DS list generator 701 may analyze video to determine a DS based upon body or lip motion. One of ordinary skill in the art may recognize alternative methods for identifying the DS.

Once the DS list generator 701 identifies the DS, it may add the current DS to a DS list. A DS list may include a file or table of DSs. The DS list may include the MSID of the DSs. In one embodiment, the DS list may include a history of the most recent DSs. Alternatively the DS list may include a history of the most active DSs. In still another embodiment, the DS list may include a list of the MSIDs that are most requested by the clients 302*a-n*. One of ordinary skill in the art may recognize additional criteria that may be used to generate the DS list.

The DS list may then be distributed to the clients 302*a-n* by sender 702. For example, the sender 702 may send an initial DS list to a new client 302 in the video conference upon identifying that the new client 302 has joined. In a further embodiment, the sender 702 may distribute updated DS lists to the clients 302*a-n* in response to an update to the list, or on a periodic basis.

It will be understood that in other embodiments, dominant or active participants may be selected using criteria other than audio participation. An active participant may be determined not only by the participant's input audio level or the frequency of input audio (i.e., a dominant speaker) but also by other non-audio inputs, such as changes in a video input, which may reflect movement of the participant, changes in the participant's location, or gestures by the participant. For example, a participant who does not speak or speaks infrequently may be designated as an active participant if he or she makes certain gestures, such as sign language or other signals, or moves by more than a threshold frequency or amount. Alternatively, an active participant on a video conference may be determined by activity on a non-audio and non-video channel, such as by identifying recent or concurrent email, text, messaging, document editing, document sharing, or other activity by the participant. For example, a participant who does not speak or speaks infrequently may be designated as an active participant if he or she sends email, texts, or other messages to other participants or shares or edits documents with other participants.

In still further embodiments, the receiver 601 may receive requests for data streams from the clients 302*a-n*. Each request may include, for example, a list of MSIDs, and identification of a video layer supported by the clients 302*a-n*. For example, referring back to the example in FIG. 4, Charles 302*c* may send a request to the MCU 106 for CIF layer video from Alice. In response, the mapping unit 603 may check the map 604 to identify one or more SSRCs that satisfy the request. In the present example, the mapping unit may determine that SSRC1 satisfies the request. The sender 702 may then send the data stream(s) associated with the identified SSRC(s) to the client 302*c*. Further details of the operations of the MCU 106 and associated methods are described below.

Figure 8:
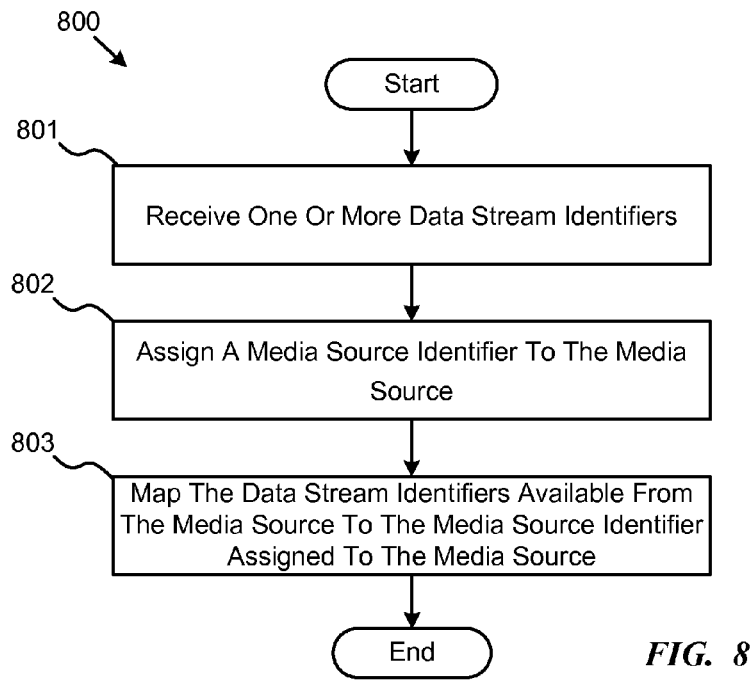
FIG. 8 is a schematic flowchart diagram illustrating one embodiment of a method for active speaker identification in video conferencing.

FIG. 8 is a schematic flowchart diagram illustrating one embodiment of a method 800 for active speaker identification in video conferencing. In one embodiment, the method 800 starts when the receiver 601 receives 801 one or more data stream identifiers (e.g., SSRCs). The MSID assignment unit 602 may then assign 802 an MSID to the client 302 transmitting the data stream. The mapping unit 603 may then map 803

Figure 9:
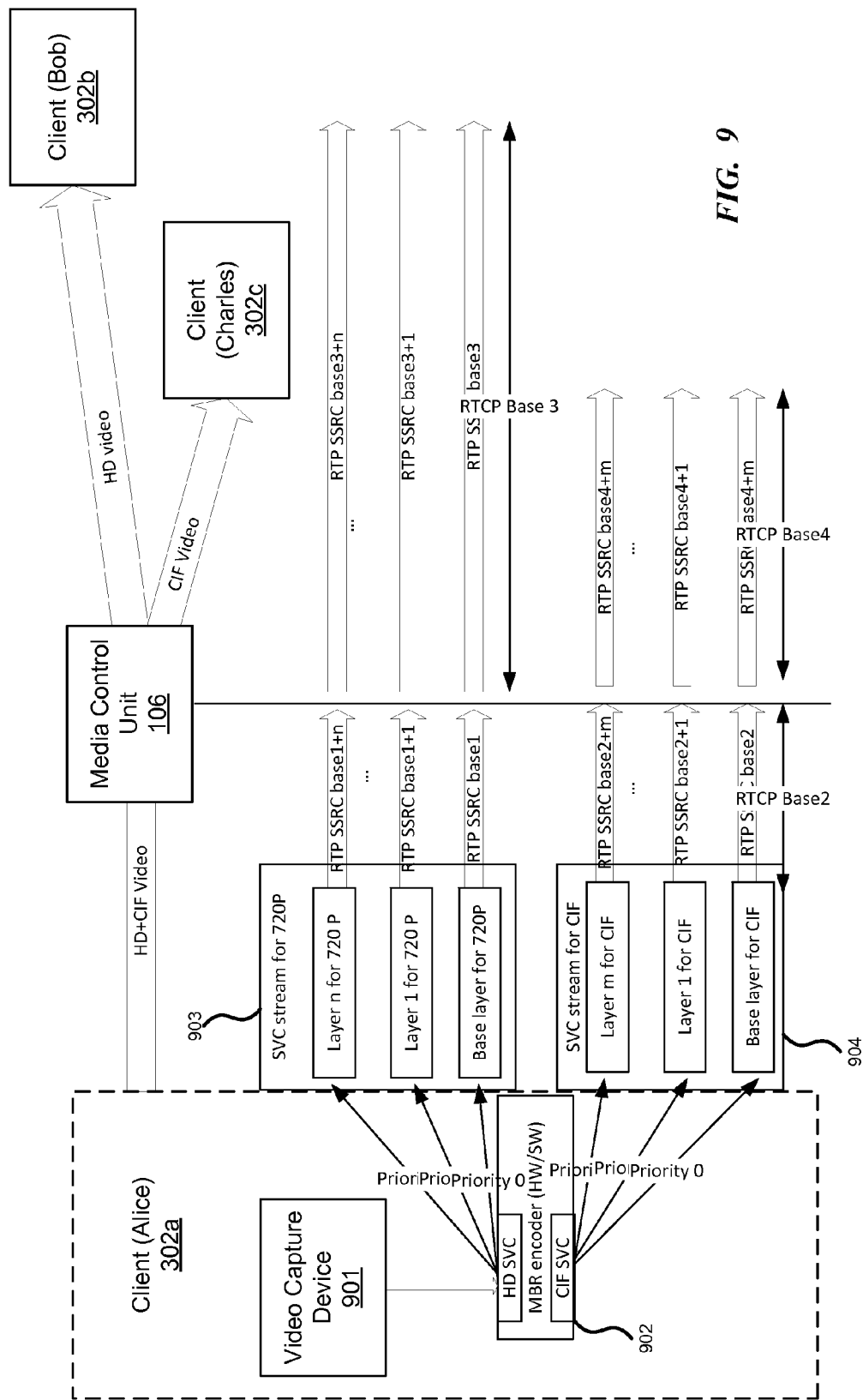
FIG. 9 is a schematic block diagram illustrating another embodiment of system for active speaker identification in video conferencing.

FIG. 9 is a schematic block diagram illustrating another embodiment of system 900 for active speaker identification in video conferencing. In one embodiment, client 402*a* for Alice (FIG. 4) may include a video capture device 901, such as a video camera or a webcam. Additionally, client 402*a* may include a codec, such as an MBR encoder 902. In one embodiment, the MBR encoder 902 may be implemented in a combination of hardware and software.

The MBR encoder 902 may generate multiple data streams from the video captured by video capture device 901. For example, the MBR encoder may generate both an HD 720p data stream 903 and a CIF data stream 904. In addition, each of the HD data stream 903 and the CIF data stream 904 may further include one or more layers. In one embodiment, a distinct SSRC may be assigned to each layer in the data streams 903, 904.

Client 402*a* may send the data streams 903, 904 to the AVMCU 106. In response to requests from Bob and Charles, AVMCU 106 may pass the HD data stream 903 to Bob 402*b* and the CIF data stream 904 to Charles 402*c*. One of ordinary skill in the art will recognize that the present embodiment is merely for illustrative purposes, and that a wide variety of system configuration may be employed for video conferencing in accordance with the present embodiments.

Figure 10:
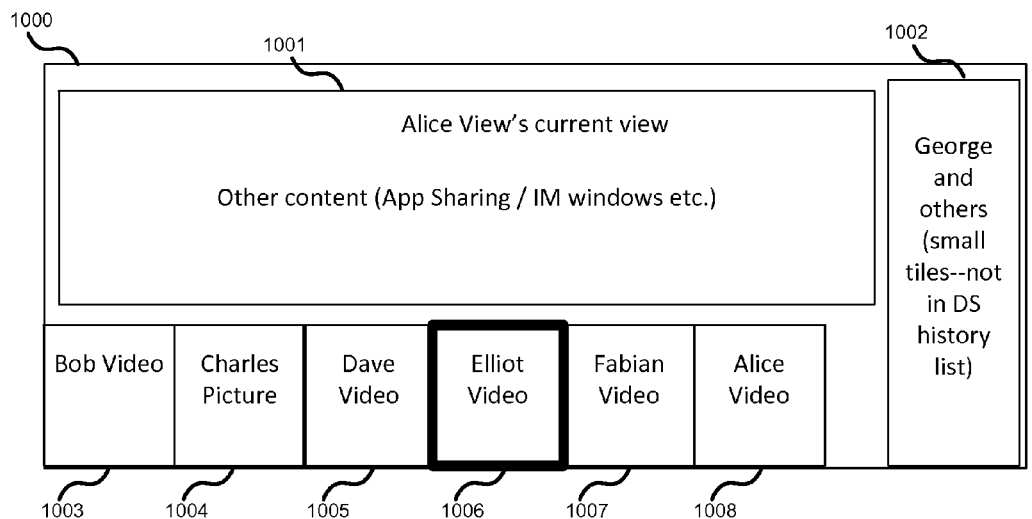
FIG. 10 is a diagram illustrating one embodiment of a video conferencing participant's screen view.

FIG. 10 is a diagram illustrating one embodiment of a video conferencing participant's screen view 1000. In one embodiment, the view 1000 may include multiple viewing panes or panels. For example, a main viewing pane 1001 may be used to display application sharing, desktop sharing, Instant Messenger (IM) windows, etc. In a further embodiment, the main viewing pane 1001 may be used to render a current DS.

Additionally, a side panel 1002 may be used for viewing a list of participants in the video conference. These participants generally would not be DSs. In one embodiment, only a still-frame image of the participant is illustrated in panel 1002. Alternatively, only a name or MSID of the participant is displayed in the side panel 1002.

In addition, multiple video panels may be used for rendering a group of DSs. For example, the DS list may specify that the most recent DSs are Bob, Charles, Dave, Elliot, and Fabian. These DSs may be displayed in windows 1003-1007 respectively. Since this is Alice's view, her video may also be displayed in window 1008. In a further embodiment, the view may include a method for identifying the currently active DS in the DS list. For example, if Elliot is currently speaking, Elliot's video window may be highlighted, enlarged, framed, or otherwise indicated.

Figure 11:
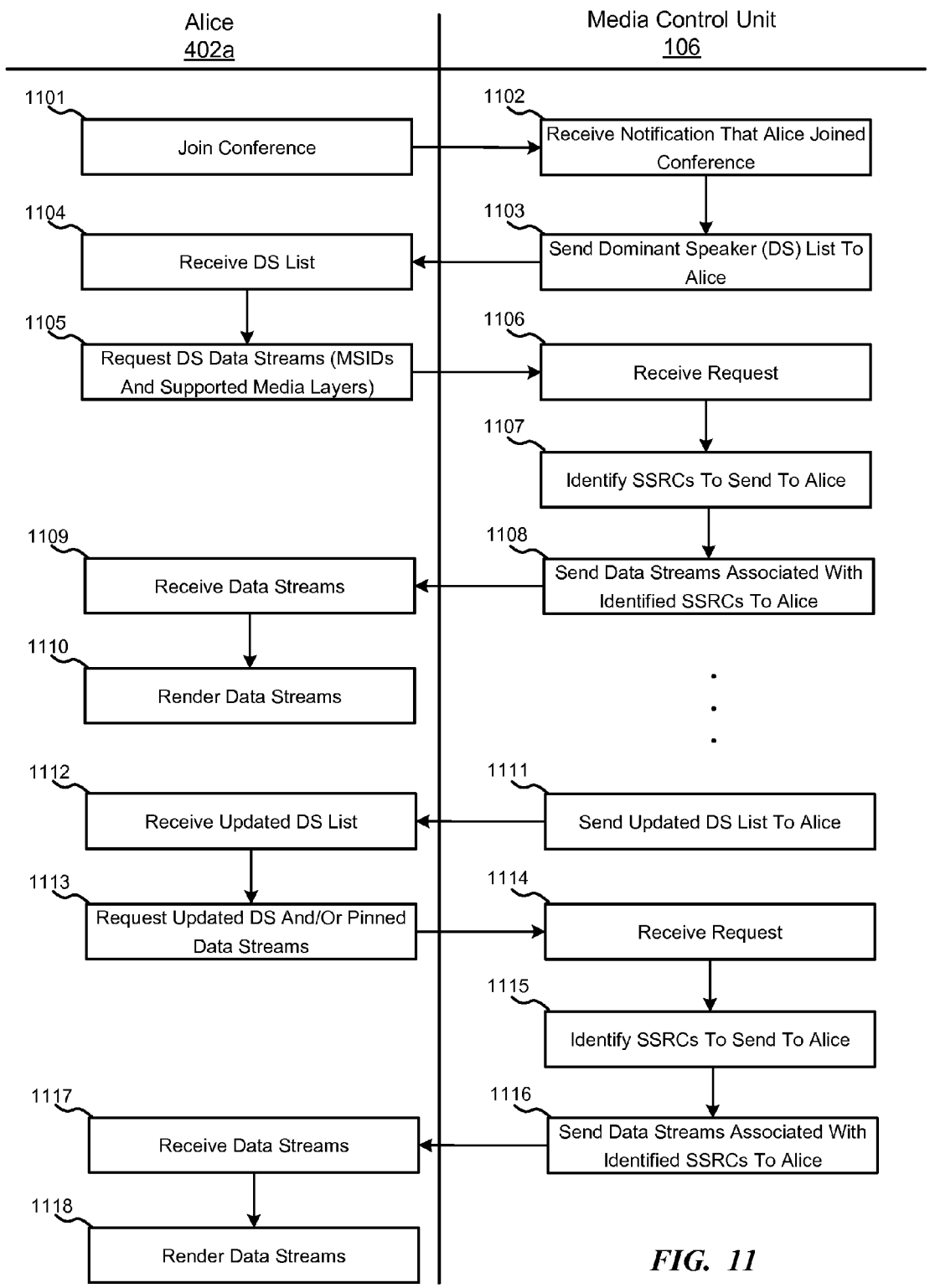
FIG. 11 is a schematic flowchart diagram illustrating another embodiment of a method for active speaker identification in video conferencing.

FIG. 11 is a schematic flowchart diagram illustrating another embodiment of a method 1100 for active speaker identification in video conferencing. In particular, this method 1100 may be used to establish and update the DSs in participant view 1000 (FIG. 10).

In one embodiment, the method starts when Alice 402*a* (FIG. 4) joins 1101 the conference. The MCU 106 may then receive 1102 notification that Alice 402*a* has joined the conference. For example, Alice 402*a* may send a notification to the MCU 106. Alternatively, Alice 402*a* may be required to negotiate credentials with the MCU 106 in order to join the conference, thereby notifying the MCU 106. The MCU 106 may then send 1103 a DS list to Alice 402*a*. Alice 402*a* may receive 1104 the DS list in turn, and request 1105 the data streams associated with the DSs on the DS list. For example, the request may include the MSIDs of the DSs as well as an indicator of the supported or requested media layers.

The MCU 106 may then receive 1106 the request from Alice 402*a*. In response, the mapping unit 603 may identify 1107 the SSRCs to send to Alice 402*a* in response to the request. Sender 702 may then send 1108 data stream(s) associated with the identified SSRCs to Alice 402*a*. In turn, Alice 402*a* may then receive 1109 the data stream(s) and render 1110 the data streams. For example, Alice 402*a* may render 1110 the data stream associated with video from Bob, Charles, Dave, Elliot, and Fabian in DS video windows (1003-1007 respectively).

In one embodiment, the DS list generator 701 (FIG. 7) may continue to monitor for changes in the DS list. If the DS list changes, the MCU 106 may send 1111 an updated DS list to Alice 402 via sender 702. Alice 402*a* may then receive 1112 the updated DS list and request 1113 an updated set of data streams according to the updates to the DS list. Alternatively, Alice 402*a* may request 1113 an updated set of data streams according to a user selection of data streams. In still a further embodiment, Alice 402a may request 1113 a combination of data streams associated with the DS list and a set of data streams associated with a user selection.

The receiver 601 on the MCU 106 may then receive 1114 the request from Alice 402a and the identification unit 703 may identify 1115 the SSRCs associated with the requested MSIDs and layers. The sender 702 may then send 1116 the data streams associated with the identified SSRCs to Alice 402a.

Figure 12:
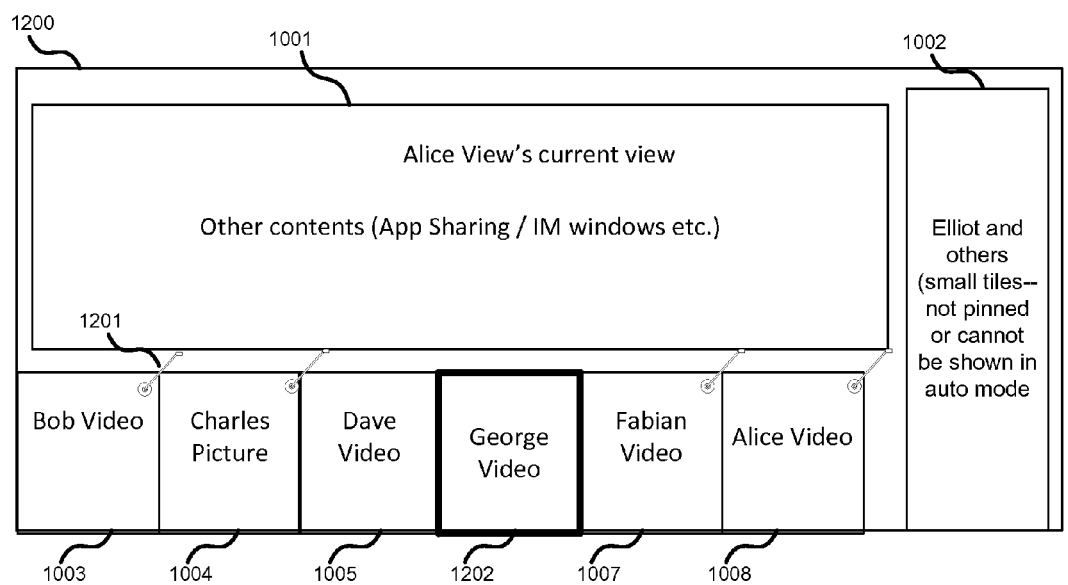
FIG. 12 is a diagram illustrating another embodiment of a video conferencing participant's screen view.

Alice 402a may then receive 1117 the new data streams and render video associated with the new data streams in an updated view as illustrated in FIG. 12.

FIG. 12 is a diagram illustrating another embodiment of a video conferencing participant's screen view 1200 that provides a modified version of view 1000 (FIG. 10). In this embodiment, the video panels at the bottom of the view may be updated according to the request 1113 (FIG. 11). For example, in this case, a user may have selected video from Bob, Charles, Fabian, and Alice for constant viewing by pinning the videos, flagging the videos, or making some other form of user selection. Pinned videos may be identified with a pin icon 1201 or the like. Additionally, video from George may replace video from Elliot at panel 1202, because George may have replaced Elliot on the DS list. One of ordinary skill in the art will recognize other possible views, including alternative arrangements of viewing panels or panes and other content within the view.

Beneficially, such embodiments may provide greater user flexibility with regard to selection of videos for viewing, allow for frequent updating of DS videos, and avoid communication errors such as SSRC collisions and the like. In general, the present embodiments may provide a user of a video conferencing system a more robust and flexible participation experience.

In a computer-implemented method, such as a processor running instructions stored on a memory, a device receives one or more data streams from a media source, where each data stream associated with a data stream identifier. A media source identifier is assigned to each data stream from the media source. The data stream identifiers are mapped to the media source identifiers. At least one of the data streams may be modified by replacing an associated data stream identifier with the media source identifier. The modified data streams are provided to a destination device.

A request is received from a destination device for data streams associated with a media source identifier. One or more data stream identifiers are associated with the requested media source identifier. The one or more data streams may be associated with Application sharing/Desktop Sharing, a video quality, a video resolution, a video frame rate, or an audio quality.

The data streams may be associated with a different layer of video data. A video capability of a destination device is determined. A plurality of data streams are provided to the destination device. The plurality of data streams are selected based upon the video capability. Each of the plurality of data streams mapped to the media source identifier.

The media source identifiers may be assigned to each data stream by a media server to uniquely identify a plurality of media sources. A list of media source identifiers may be provided to a destination device. The list of media source identifiers may correspond to a list of active participants. The list of active participants may comprise, for example, a list of dominant speakers.

The one or more data streams associated with each of the media source identifiers may be automatically provided as requested by a destination device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
   receiving one or more data streams from a media source, each data stream associated with a data stream identifier;
   assigning a media source identifier to each data stream from the media source; and
   mapping the data stream identifiers to the media source identifiers.

2. The computer-implemented method of claim 1, further comprising:
   modifying at least one of the data streams by replacing an associated data stream identifier with the media source identifier; and
   providing the at least one modified data streams to a destination device.

3. The computer-implemented method of claim 1, further comprising:
   receiving a request from a destination device for data streams associated with a media source identifier; and
   identifying one or more data stream identifiers associated with the requested media source identifier.

4. The computer-implemented method of claim 1, wherein each of the one or more data streams are associated with Application sharing/Desktop Sharing, a video quality, a video resolution, a video frame rate, or an audio quality.

5. The computer-implemented method of claim 1, wherein each of the data streams is associated with a different layer of video data, the method further comprising:
   determining a video capability of a destination device; and
   providing a plurality of data streams to the destination device, the plurality of data streams selected based upon the video capability, and each of the plurality of data streams mapped to the media source identifier.

6. The computer-implemented method of claim 1, wherein the media source identifiers are assigned to each data stream by a media server to uniquely identify a plurality of media sources.

7. The computer-implemented method of claim 1, further comprising:
   providing a list of media source identifiers to a destination device.

8. The computer-implemented method of claim 7, wherein the list of media source identifiers corresponds to a list of active participants.

9. The computer-implemented method of claim 8, wherein the list of active participants comprises a list of dominant speakers.

10. The computer-implemented method of claim 7, further comprising:
    automatically providing one or more data streams associated with each of the media source identifiers as requested by a destination device.

11. A computer-readable storage medium, wherein the computer-readable storage medium is not a signal, storing computer-executable instructions that when executed by at least one processor cause the at least one processor to perform operations comprising:
    receiving one or more data stream identifiers, each data stream identifier associated with a data stream available from a media source;

assigning a media source identifier to the media source; and mapping the data stream identifiers available from the media source to the media source identifier assigned to the media source.

12. The computer-readable storage medium of claim 11, further comprising:

identifying one or more data stream identifiers associated with the requested media source identifier; and selecting data streams associated with the data stream identifier that support a video capability of a destination device.

13. The computer-readable storage medium of claim 11, further comprising:

modifying at least one of the data streams by replacing an associated data stream identifier with the media source identifier; and providing the at least one modified data streams to a destination device.

14. The computer-readable storage medium of claim 13, further comprising:

providing a list of media source identifiers to a destination device.

15. The computer-readable storage medium of claim 14, wherein the list of media source identifiers corresponds to a list of active participants.

16. The computer-readable storage medium of claim 15, further comprising:

automatically providing one or more data streams associated with each of the media source identifiers requested by a destination device.

17. A computer system, comprising:

one or more processors;

one or more computer-readable storage media, wherein the computer-readable storage media are not signals, having stored thereon computer-executable instructions that, when executed by the one or more processors, causes the processors to perform operations comprising:

receiving one or more data stream identifiers, each data stream identifier associated with a data stream available from a media source;

assigning a media source identifier to the media source; and mapping the data stream identifiers available from the media source to the media source identifier assigned to the media source.

18. The computer system of claim 17, wherein the operations further comprise:

receiving a request from a destination device for data streams associated with a media source identifier; and identifying one or more data stream identifiers associated with the requested media source identifier.

19. The computer system of claim 17, wherein the operations further comprise:

modifying at least one data streams by replacing an associated data stream identifier with the media source identifier; and providing the at least one modified data streams to a destination device.

* * * * *